April 2, 1946. E. C. CLARK Re. 22,738

PANTIE GIRDLE

Original Filed Feb. 29, 1944

INVENTOR
ELIZABETH C. CLARK
BY Clark & Ott
ATTORNEYS

Reissued Apr. 2, 1946

Re. 22,738

UNITED STATES PATENT OFFICE 22,738

PANTIE GIRDLE

Elizabeth C. Clark, New York, N. Y.

Original No. 2,363,775, dated November 28, 1944, Serial No. 524,347, February 29, 1944. Application for reissue July 13, 1945, Serial No. 604,916

8 Claims. (Cl. 2—43)

This invention relates to feminine undergarments and is directed more particularly to an improvement in the class of undergarments known in the trade as pantie girdles, that is, a combined foundation or supporting garment and a nether garment which affords abdominal support while also covering and protecting the crotch area.

One of the principal objections and drawbacks to this class of garments has been the difficulty and inconvenience experienced by the wearers by having to lower the garment for functional purposes and to subsequently raise said garment and readjust the outer clothing thereover and, while some attempts have been made to provide a convenience opening in the crotch portion thereof, the same have proven unsatisfactory and ineffective due to the restricted size of said convenience opening and the failure to provide proper means for closing the same to cover and protect the crotch area.

In order to overcome the above recited objections and disadvantages, the present invention comprehends an improved pantie girdle which is so constructed as to provide a relatively large convenience opening in the crotch portion thereof together with means for completely closing said opening to cover and protect the crotch area.

More particularly the invention resides in a garment of the indicated character which includes an abdominal embracing member having depending leg portions which respectively cover the front, rear and outer side surfaces of the legs and which are open at the inner confronting sides with gore pieces having upper concave edges located within the open confronting inner sides of the leg portions and secured thereto at the front and rear edges thereof to the front and rear edges of the leg portions with the upper concave edges unsecured to provide a relatively large convenience opening and a covering flap corresponding approximately in size and shape to that of the gore pieces and secured at its upper concave edge to the upper concave edge of one of the gore pieces with detachable means connecting the covering flap in overlying relation to the other gore piece so as to close said convenience opening.

With the above enumerated and other objects in view, the invention, is set forth in greater detail in the following specification, particularly pointed out in the appended claims and illustrated in the accompanying drawing in which, Fig. 1 is a front view of a pantie girdle constructed in accordance with the invention and illustrating the cover flap in closed position;

Figure 1:
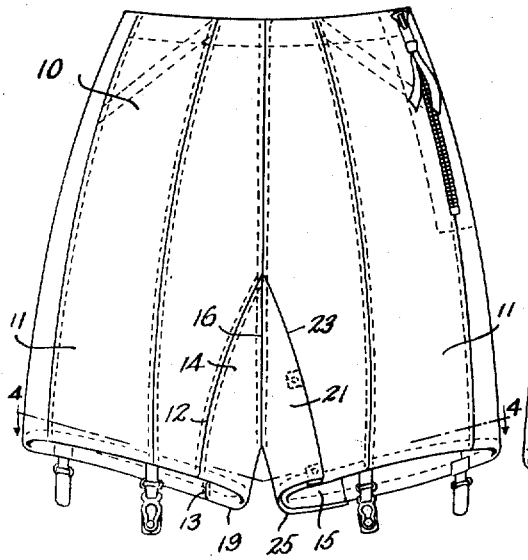
Figure 2:
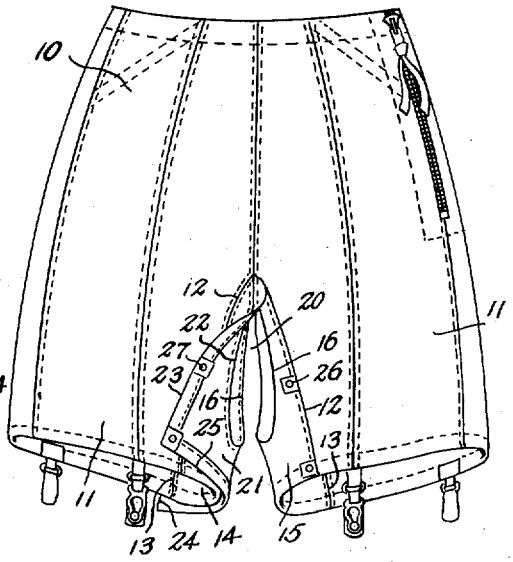
Fig. 2 is a similar view illustrating the cover flap in open position.
Figure 3:
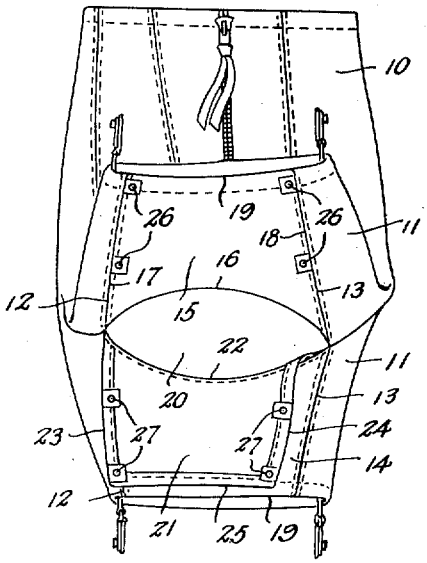
Fig. 3 is a side view of the garment with one of the leg portions turned upwardly and illustrating the cover flap in open position.
Figure 4:
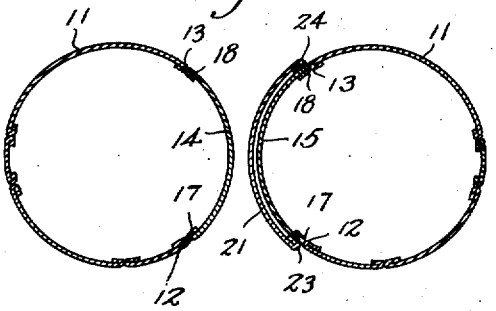
Fig. 4 is a sectional view taken approximately on the line 4—4 of Fig. 1.

Referring to the drawing by characters of reference the garment includes an abdominal embracing member 10 which may be of any desired fabric and so constructed and reinforced as to provide the necessary fit and required support. The member 10 includes preferably integral depending leg portions 11 of the same material or an equivalent fabric to that of the said member 10. Each of the leg portions 11 is fashioned or designed so as to cover and snugly fit around the front, rear and outer side surfaces of the legs whereby said leg portions 11 are open at the inner confronting sides and which open inner sides are defined by front and rear edges 12 and 13 which, as shown, preferably converge downwardly with reference to each other.

Gore pieces or gussets 14 and 15, preferably of a softer and more flexible fabric than the member 10 and leg portions 11, are inserted and secured within the inner confronting open sides of the leg portions of the garment and, as illustrated in the drawing, said gore pieces or gussets each have a concave upper edge 16, front and rear edges 17 and 18 which converge downwardly and a substantially straight lower edge 19. The front and rear side edges 17 and 18 of the gore pieces 14 and 15 are respectively secured in any desired manner to the front and rear edges 12 and 13 of the leg portions 11 so that the lower edges 19 of the gore pieces are substantially flush with the lower edges of the leg portions 11 while the upper concave edges 16 of said gore pieces 14 and 15 remain free and unsecured to define a relatively large convenience opening 20, which runs from the back to the front of the garment in the crotch portion thereof and whose side edges converge at the front and rear ends of the opening.

In order to normally close the convenience opening 20 for covering and protecting the crotch area, a cover flap 21 is provided which consists of a piece of fabric corresponding approximately in size and shape to and preferably of the same material as the gusset or gore pieces 14 and 15. As shown, the flap 21 is formed with a concave upper edge 22, front and rear edges 23 and 24 and a substantially straight lower edge 25, the upper concave edge 22 thereof being secured to the concave upper edge 16 of one of the gore pieces, in the present disclosure the gore piece 14 of the right leg portion 11.

Any suitable means may be employed for detachably retaining the cover flap 21 in covering relation to the other gore piece 15 so as to close the convenience opening 20 but as illustrated said means is shown as interengageable snap fastener elements 26 and 27 which are respectively secured to and carried by the front and rear edge portions 12 and 13 of the gore piece 15 and the front rear edge portions 23 and 24 of the cover flap 21.

Having thus fully described the invention, what is claimed as new and for which it is desired to secure Letters Patent, is:

1. A pantie girdle including a relatively inflexible abdominal embracing and supporting body member having depending leg portions each of which cover the front rear and side surfaces of the legs and which are open at the inner confronting sides thereof to define downwardly convergent front and rear side edges, gore pieces of relatively softer more flexible material than the body member and each having a concave upper edge and downwardly convergent front and rear edges, said gore pieces being respectively disposed within the open confronting inner sides of the leg portions and permanently secured at the front and rear edges thereof to the front and rear edges of the openings at the inner confronting sides of the leg portions with the upper concave edges of said gore pieces free and unsecured to provide a relatively large convenience opening, a cover flap of relatively softer and more flexible material corresponding approximately in size and shape to said gore pieces and permanently secured at its upper concave edge to the upper concave edge of one of the gore pieces with the remaining edges free and unsecured, and detachable means for connecting the side edges of the cover flap to the side edges of and in overlying relation with the other gore piece to close said convenience opening.

2. In a combined foundation and nether garment, an abdominal embracing and supporting member of relatively inflexible material, substantially semi-annular integral leg portions depending therefrom and having inner confronting cutaway crotch areas, gusset pieces of a softer more flexible material permanently secured within the cutaway crotch areas to complete each of the leg portions and to cover the adjacent uncovered portions of the legs of the wearer, the upper edges of said gusset pieces being free and unsecured to define a convenience opening of relatively large size, a cover flap permanently secured at its upper edge to the upper edge of one of the gusset pieces and depending therefrom with the remaining edges free and unsecured, and detachable means for retaining said cover flap in covering relation to the other gusset piece to close the convenience opening.

3. In a combined girdle and nether garment, a relatively inflexible supporting member extending downwardly from the waistline to a region below the crotch of the wearer with the front and rear of the lower portion of said member notched upwardly from the lower edge to define a pair of separated semi-annular leg covering portions extending around the front and rear and outer side surfaces of the legs, and a crotch structure including a pair of gusset inserts of a softer and more flexible material than said member permanently secured at the vertical edges thereof to vertical edges of the leg covering portions respectively so as to complete the same and extend around the uncovered inner side surface of the legs with the upper edges of the gusset inserts being free from and unsecured to each other for defining a convenience opening of relatively large size, and a cover flap permanently secured at its upper edge to the upper edge of one of the gusset inserts and with the remaining edges free and unsecured, said flap being adapted to be detachably secured in overlying relation to the other gusset insert for closing the convenience opening.

4. A pantie girdle including an abdominal embracing and supporting body member having depending leg portions each of which cover the front rear and side surfaces of the legs and which are open at the inner confronting sides thereof to define downwardly convergent front and rear side edges, gore pieces of soft flexible material each having a concave upper edge and downwardly convergent front and rear edges, said gore pieces being respectively disposed within the open confronting inner sides of the leg portions and permanently secured at the front and rear edges thereof to the front and rear edges of the openings at the inner confronting sides of the leg portions with the upper concave edges of said gore pieces free and unsecured to provide a relatively large convenience opening, a cover flap of soft flexible material corresponding approximately in size and shape to said gore pieces and permanently secured at its upper concave edge to the upper concave edge of one of the gore pieces with the remaining edges free and unsecured, and detachable means for connecting the side edges of the cover flap to the side edges of and in overlying relation with the other gore piece to close said convenience opening.

5. In a combined foundation and nether garment, an abdominal embracing and supporting member, substantially semi-annular integral leg portions depending therefrom and having inner confronting cutaway crotch areas, gusset pieces of soft flexible material permanently secured within the cutaway crotch areas to complete each of the leg portions and to cover the adjacent uncovered portions of the legs of the wearer, the upper edges of said gusset pieces being free and unsecured to define a convenience opening of relatively large size, a cover flap permanently secured at its upper edge to the upper edge of one of the gusset pieces and depending therefrom with the remaining edges free and unsecured, and detachable means for retaining said cover flap in covering relation to the other gusset piece to close the convenience opening.

6. In a combined girdle and nether garment, a supporting member extending downwardly from the waistline to a region below the crotch of the wearer with the front and rear of the lower portion of said member notched upwardly from the lower edge to define a pair of separated semi-annular leg covering portions extending around the front and rear and outer side surfaces of the legs, and a crotch structure including a pair of gusset inserts of soft flexible material permanently secured at the vertical edges thereof to vertical edges of the leg covering portions respectively so as to complete the same and extend around the uncovered inner side surface of the legs with the upper edges of the gusset inserts being free from and unsecured to each other for defining a convenience opening of relatively large size, and a cover flap permanently secured at its upper edge to the upper edge of one of the gusset inserts and with the remaining edges free and unsecured, said flap being adapted to be detachably secured in overlying relation to the other gusset insert for closing the convenience opening.

7. In a combined foundation and nether garment, an abdominal embracing and supporting member having integral leg portions depending therefrom, said garment having a convenience opening in the crotch portion thereof extending from the front to the rear of the garment, a cover flap for said opening, means to permanently secure said flap to one of the leg portions at one side of the convenience opening along a line running from the front to the back of the garment, and means to detachably secure said cover flap to the other leg portion.

8. In a combined foundation and nether garment, an abdominal embracing and supporting member having integral leg portions depending therefrom, said garment having a convenience opening in the crotch portion thereof extending from the front to the rear of the garment and whose side edges converge at the front and rear ends of the opening, a cover flap for said opening, means to permanently secure said flap to a side edge of the opening running from the front to the back of the garment, and means to detachably secure the flap to the leg portion including the other side edge of the convenience opening in a direction extending generally from the front to the rear of the garment.

ELIZABETH C. CLARK.